US011847121B2

(12) United States Patent
Zilio et al.

(10) Patent No.: US 11,847,121 B2
(45) Date of Patent: Dec. 19, 2023

(54) COMPOUND PREDICATE QUERY STATEMENT TRANSFORMATION

(71) Applicant: INTERNATIONAL BUSINESS MACHINES CORPORATION, Armonk, NY (US)

(72) Inventors: Daniele Costante Zilio, Georgetown (CA); Muhammad Esaad Afaque, Thornhill (CA); Darren Andrew Pepper, North York (CA); Xi Sun, Toronto (CA); Kostas Rakopoulos, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 17/458,750

(22) Filed: Aug. 27, 2021

(65) Prior Publication Data

US 2023/0082446 A1 Mar. 16, 2023

(51) Int. Cl.
*G06F 16/24* (2019.01)
*G06F 16/2455* (2019.01)
*G06F 16/2453* (2019.01)

(52) U.S. Cl.
CPC .... *G06F 16/24561* (2019.01); *G06F 16/2456* (2019.01); *G06F 16/24535* (2019.01)

(58) Field of Classification Search
CPC ........... G06F 16/24561; G06F 16/2465; G06F 16/2453; G06F 16/2456

(Continued)

(56) References Cited

U.S. PATENT DOCUMENTS 6,449,606 B1 * 9/2002 Witkowski ........ G06F 16/24539
6,684,203 B1 * 1/2004 Waddington ...... G06F 16/24537
707/756

(Continued)

OTHER PUBLICATIONS

Rahn, G., "Null-Aware Anti-Join", Structured Data, May 22, 2008. Retrieved on Aug. 23, 2021 from the Internet URL: <http://structureddata.org/2008/05/22/null-aware-anti-join/>, 14 pgs.

(Continued)

*Primary Examiner* — Hosain T Alam
*Assistant Examiner* — Tracy M McGhee
(74) *Attorney, Agent, or Firm* — Stephanie Carusillo; George S. Blasiak; Heslin Rothenberg Farley & Mesiti P.C.

(57) ABSTRACT

Methods, computer program products, and systems are presented. The method computer program products, and systems can include, for instance: obtaining a query statement; parsing the query statement and determining from the parsing that the query statement is a compound predicate query statement that includes a first predicate and a second predicate; responsively to the parsing, rewriting the obtained query statement to provide a transformed query statement, wherein the rewriting includes (a) specifying generating of a temporary table, wherein the specified generating uses data values of the first predicate and (b) specifying a join function that uses the temporary table and a table referenced in the query statement; evaluating a candidate access path associated to the transformed query statement; selecting the candidate access path as an access path for execution; and executing the transformed query statement according to the selected candidate access path for execution.

20 Claims, 10 Drawing Sheets

(58) Field of Classification Search
USPC .......................................................... 707/769
See application file for complete search history.

(56) References Cited

U.S. PATENT DOCUMENTS

| | | | |
|---|---|---|---|
| 7,676,450 B2 | 3/2010 | Ahmed et al. | |
| 2002/0188600 A1* | 12/2002 | Lindsay | G06F 16/24544 |
| 2006/0106765 A1* | 5/2006 | Froehlich | G06F 16/24535 |
| 2007/0038618 A1 | 2/2007 | Kosciusko et al. | |
| 2007/0219943 A1* | 9/2007 | Draughn | G06F 16/24535 |
| 2014/0067789 A1* | 3/2014 | Ahmed | G06F 16/24544 |
| | | | 707/E17.017 |
| 2018/0341679 A1 | 11/2018 | Moerkotte et al. | |
| 2019/0087460 A1* | 3/2019 | Beavin | G06F 16/24535 |
| 2019/0114295 A1 | 4/2019 | Cao et al. | |
| 2020/0089674 A1 | 3/2020 | Boehme et al. | |
| 2020/0151180 A1 | 5/2020 | Lee et al. | |
| 2021/0124742 A1* | 4/2021 | Ahmed | G06F 16/24544 |

OTHER PUBLICATIONS

Shaw, G., "Not Exists vs Not In", SQLServerCentral, Feb. 18, 2010. Retrieved on Aug. 23, 2021 from the Internet URL: <https://www.sqlservercentral.com/blogs/not-exists-vs-not-in>, 6 pgs.

Prajdić, M., "SQL Server: JOIN vs IN vs EXISTS—the logical difference", May 18, 2007. Retrieved on Aug. 23, 2021 from the Internet URL: <https://weblogs.sqlteam.com/mladenp/2007/05/18/60210/>, 16 pgs.

Mell, Peter, et al., "The NIST Definition of Cloud Computing", NIST Special Publication 800-145, Sep. 2011, Gaithersburg, MD, 7 pgs.

* cited by examiner

COMPOUND PREDICATE QUERY STATEMENT TRANSFORMATION

BACKGROUND

Embodiments herein relate to databases in general and specifically to query statement transformation for database performance optimization.

Databases can be defined by an organized collection of data accessed electronically from a computer system. Databases can have associated Database Management Systems (DBMS). Database data can be organized in a series of tables having rows and columns of data.

Structured Query Language (SQL) is a domain specific language used in programming data management in a Database Management System (DBMS). SQL query statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table. SQL can be used for programming and managing data of a relational data stream management system (RDSMS). SQL can be used for handling structured data where the defined relationships are trained different entities and/or variables of the data. SQL can include various sublanguages including the Data Query Language (DQL), Data Definition Language (DDL), Data Control Language (DCL), and Data Manipulation Language (DML). With the use of SQL various operations can be performed on a database including. e.g., data query, data manipulation (INSERT, UPDATE, and/or DELETE), data definition (schema creation and modification), and data access control.

Database tables can include one or more index. An index can be provided by a data structure that improves access to a database table. A Database index is a database data structure that can be used for improving performance of database operations, such as the aforementioned INSERT, UPDATE, SELECT, and DELETE operations that can be performed with use of SQL statements. A database table index can be characterized by a hierarchical structure having leaf pages at a lowest level leaf pages, intermediary (non leaf) pages at one or more intermediary level of hierarchy, and a highest level of hierarchy consisting of a root page.

Data structures have been employed for improving operation of computer system. A data structure refers to an organization of data in a computer environment for improved computer system operation. Data structure types include containers, lists, stacks, queues, tables, and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: obtaining a query statement; parsing the query statement to determined that the query statement is a compound predicate query statement that includes a first predicate and a second predicate; responsively to the parsing, rewriting the obtained query statement to provide a transformed query statement, wherein the rewriting includes (a) specifying generating of a temporary table, wherein the specified generating uses data values of the first predicate and (b) specifying a join function that uses the temporary table and a table referenced in the query statement; evaluating a candidate access path associated to the transformed query statement; selecting the candidate access path as an access path for execution; and executing the transformed query statement according to the selected candidate access path for execution.

In another aspect, a computer program product can be provided. The computer program product can include a computer readable storage medium readable by one or more processing circuit and storing instructions for execution by one or more processor for performing a method. The method can include, for example: obtaining a query statement; parsing the query statement to determined that the query statement is a compound predicate query statement that includes a first predicate and a second predicate; responsively to the parsing, rewriting the obtained query statement to provide a transformed query statement, wherein the rewriting includes (a) specifying generating of a temporary table, wherein the specified generating uses data values of the first predicate and (b) specifying a join function that uses the temporary table and a table referenced in the query statement; evaluating a candidate access path associated to the transformed query statement; selecting the candidate access path as an access path for execution; and executing the transformed query statement according to the selected candidate access path for execution.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining a query statement; parsing the query statement to determined that the query statement is a compound predicate query statement that includes a first predicate and a second predicate; responsively to the parsing, rewriting the obtained query statement to provide a transformed query statement, wherein the rewriting includes (a) specifying generating of a temporary table, wherein the specified generating uses data values of the first predicate and (b) specifying a join function that uses the temporary table and a table referenced in the query statement; evaluating a candidate access path associated to the transformed query statement; selecting the candidate access path as an access path for execution; and executing the transformed query statement according to the selected candidate access path for execution.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
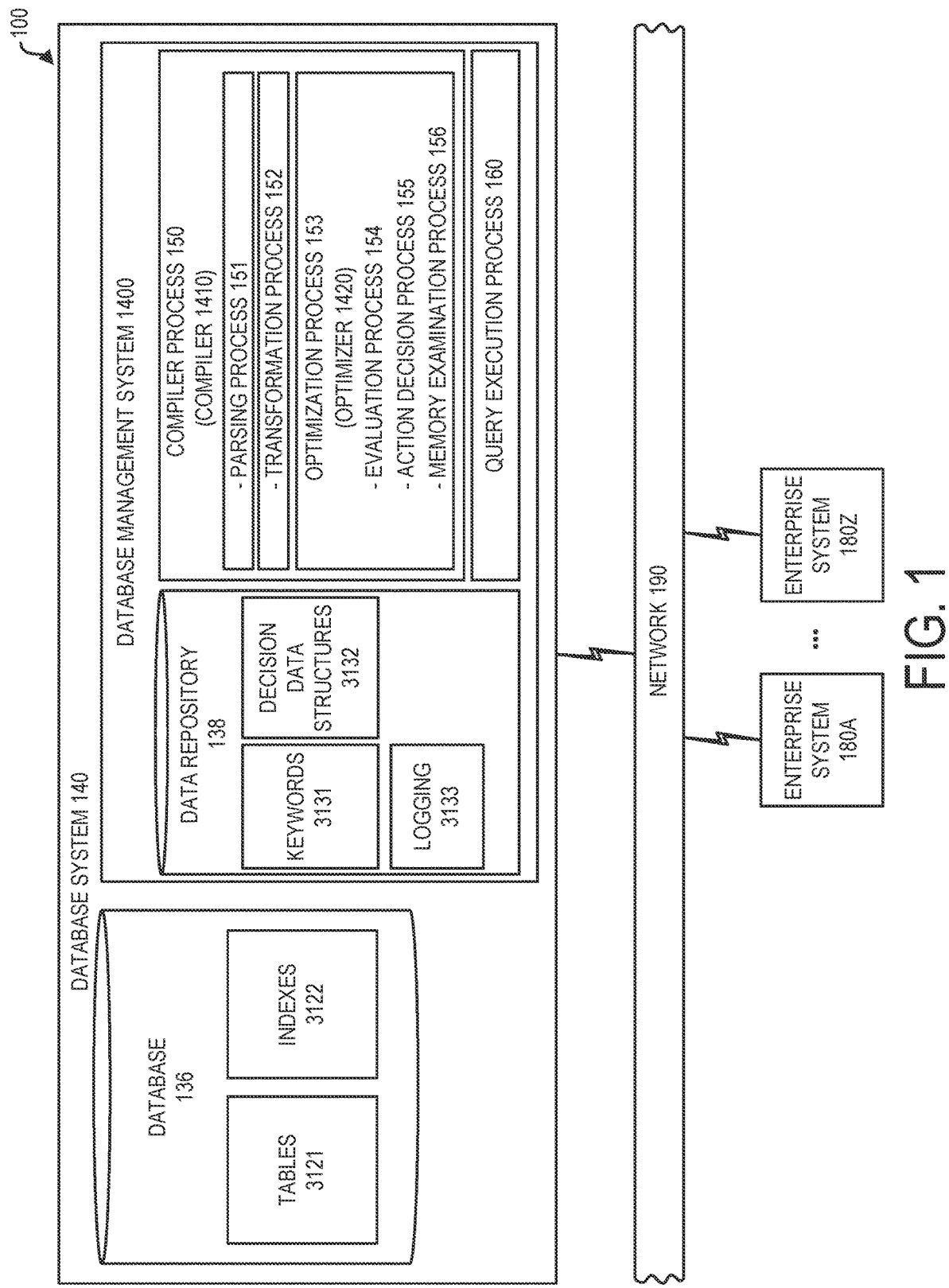
FIG. 1 depicts a system having a database system and enterprise systems according to one embodiment.

System 100 for use in improving response time of a database is set forth in one embodiment of FIG. 1. System 100, according to one embodiment, can include database system 140 and enterprise systems 180A-180Z. Database system 140 and enterprise systems 180A-180Z can be in communication with one another via network 190, according to one embodiment. Network 190 may be a physical network and/or a virtual network. A physical network can be, for example, a physical telecommunications network connecting numerous computing nodes of systems such as computer servers and computer clients. A virtual network can, for example, combine numerous physical networks or parts thereof into a logical virtual network. In another example, numerous virtual networks can be defined over a single physical network.

Database system 140 and enterprise systems 180A-180Z can be provided by computing node-based devices and systems and can be in communication with one another via network 190. According to one embodiment, each of database system 140 and enterprise systems 180A-180Z can be external to one another, e.g., located on different computing nodes, e.g., different physical computing nodes. According to one embodiment, one or more of database system 140 and enterprise systems 180A-180Z can be collocated with at least one of database system 140 for enterprise systems 180A-180Z. According to one embodiment, database system 140 can be provided by a Structured Query Language (SQL) database system that is able to respond to SQL based query statements.

In the course of use of system 100, database system 140 can receive queries from one or more enterprise system of enterprise systems 180A-180Z. Queries received by database system 140 can take the form of query statements such as SQL query statements. Database system 140 can include database 136 and database management system (DBMS) 1400. Database 136 can include Tables 3121 and indexes 3122. Tables can logically organize data into columns and rows of data. A row of data within a table can define a record. Each table of Tables 3121 can have associated thereto zero or more indexes of indexes 3122.

A database table index refers to a data structure that can improve the speed of database operations such as database INSERT, UPDATE, SELECT, and DELETE operations. A database table index can be represented by a tree data structure and can be characterized by a lowest level referred to as a leaf page level, one or more intermediate level, and a highest level referred to as a root page level consisting of a root page.

Embodiments herein recognize that some query statements can consume significant handling time including for performance of bind time processing and for execution. Embodiments herein can include processes for rewriting query statements for output of transformed query statements which can be evaluated as candidate query statements for execution. Embodiments herein recognize, according to one example, that query statements having compound predicates can consume significant handling time. Embodiments herein can include features for rewrite of compound predicate query statements for providing a transformed query statement for evaluation. Embodiments herein can include specifying generating a temporary table using values associated to first and second predicates of a query statement and specifying performing a join function using the generated temporary table. Generating a temporary table and performing a join function operation to provide a transformed query statement for evaluation can reduce query statement handling time.

Embodiments herein can include processes to rewrite an obtained query statement to provide a transformed query statement. The obtained query statement and the transformed query statement can define a set of candidate query statements that can be subject to evaluation. Embodiments herein can select a determined lowest cost candidate query statement and associated access path. On obtaining of a query statement, embodiments herein can parse and transform a query statement to generate a transformed query statement. The obtained query statement and the transformed query statement can define a set of candidate query statements for evaluation with candidate access paths associated, respectively, to the obtained query statement and transformed query statement. In bind time processing of a query statement, embodiments herein can evaluate a plurality of candidate access paths wherein a first access path is associated to the obtained query statement defining a candidate query statement, and a second candidate access path is associated to the transformed query statement defining a candidate query statement. Embodiments herein can select one of the candidate query statements and its associated access path for execution. In runtime execution of the query statement, embodiments herein can execute the selected candidate query statement using the selected candidate access path.

DBMS 1400 can run various processes including compiler process 150 (defining a compiler 1410) and query execution process 160. DBMS 1400 can perform compiler process 150 in bind time and can perform query execution process 160 in runtime. DBMS 1400 can perform compiler process 150 to optimize and select between various candidate query statements and access paths. Various candidate access paths can be associated to different various candidate query statements. The candidate query statements can include an obtained query statement and one or more transformed query statements transformed from the obtained query statement.

Compiler process 150 can include parsing process 151, transformation process 152, and an optimization process 153 (defining an optimizer 1420) that includes evaluation process 154, action decision process 155, and memory examination process 156.

DBMS 1400 running parsing process 151 can include DBMS 1400 separating a query statement into its constituent elements to identify constituent elements thereof, including e.g., keywords, operators, clauses, expressions, identifiers, logical constants, referenced tables, and referenced table subelements including columns.

DBMS 1400 running transformation process 152 can rewrite an obtained query statement to provide a transformed query statement. The transformed query statement with the obtained original query statement can define a set of candidate query statements for evaluation and execution responsively to selection. DBMS 1400 running transformation process 152 can rewrite a compound predicate query statement for providing a transformed query statement for evaluation. The transformed query statement can be logically equivalent to the obtained query statement. By being logically equivalent, execution of the transformed query statement can produce a result equivalent to the result that would be produced on execution of the obtained query statement. DBMS 1400 for miming transformation process 152 can generate a temporary table using values associated to first and second predicates of a compound predicate query statement and can specify a join function using the generated temporary table. In some use cases, generating a temporary table and performing a join function operation can reduce query statement handling time. DBMS 1400 running transformation process 152 can include DBMS 1400 generating a semantic tree data structure representing the obtained query statement obtained by compiler process 150. The generated semantic tree data structure can include nodes specifying operations of a query statement and edges specifying an order of operation of the edges.

DBMS 1400 running evaluation process 154 can evaluate candidate access paths associated, respectively, to an obtained query statement and a transformed query statement produced by transforming the obtained query statement. DBMS 1400 running evaluation process 154 can evaluate the first and second candidate access paths associated, respectively, to the obtained query statement and the transformed query statement defining candidate query statements for evaluation. DBMS 1400 running evaluation process 154 can include DBMS 1400 performing a cost analysis of a first candidate access path associated to an obtained query statement and a second candidate access path associated to transformed query statement output by transformation process 152.

DBMS 1400 running action decision process 155 can select a candidate access path from the evaluated candidate access paths. DBMS 1400 running action decision process 155, according to one embodiment, can select, in dependence on the evaluating by evaluation process 154, the predicted best performing access path and associated candidate query statement as the selected access path and candidate query statement for use in runtime processing. The predicted best performing access path and associated candidate query statement can be the access path and associated candidate query statement producing the lowest cost score.

DBMS 1400 running query execution process 160 can execute the selected candidate query statement according to the selected access path from the candidate access paths, i.e., the original query statement or the transformed query statement using the selected candidate access path selected by action decision process 155.

In SQL, database data can be stored in logically divided memory locations known as pages. Pages are 8 KB in size and are defined in various types including data pages and index pages. Pages can include a page header, data rows, and a row offset array. The header of a page can include a field that specifies an amount of free space on a page.

DBMS 1400 can run an index management process to generate new indexes for tables so that each table of database system 140 has associated thereto zero or more indexes. Indexes associated with tables can improve the performance of operation with respect to such tables, e.g., can reduce the time required for responding to a query operation. DBMS 1400 running the described index management process can include DBMS 1400 generating new indexes for tables and, e.g., new leaf pages for indexes.

DBMS 1400 can generate zero or more indexes per table. DBMS 1400 running described index management process 143 can include DBMS 1400 examining incoming query statements and based on a determination that a current leaf page has insufficient free space to store a new record, can execute an index split operation. An index split operation can include, e.g., allocating a leaf page from a page store, linking related pages to the leaf pages, and copying data from the current leaf page to the newly allocated leaf page. An index management process can define an index manager (IM).

An index can be defined for a column of a table. The column for which a table index is defined can be referred to as a key column (key) for the index and the values of the column can be referred to as column values (key values). When an index is defined, the IM can create leaf pages for storage of records of the table. The pages can be ordered in accordance with an order of column values (key values) of the column for which the index is defined; that is, the column "city" records for cities beginning with the letter "B" can be associated to leaf pages ordered after leaf pages associated to cities beginning with the letter "B". The column "transaction ID" records for transaction IDs beginning with 002 can be associated to leaf pages ordered after leaf pages associated to transaction IDs beginning with 001. Leaf pages can be assigned unique addresses defining their order. In a clustered index, leaf pages store one or more data record. In a non-clustered index, a leaf page can have pointer(s) pointing the data page(s) storing data records. Clustered indexes can sort and store the data rows in the table based on key values of an index definition. Because the data rows themselves can be stored in only one order, there can be defined, according to one embodiment, one clustered index per table. Non-clustered indexes have a structure separate from the data rows. A non-clustered index can contain non-clustered index key values and each key value entry can have a pointer to the data row that contains the key value.

Figure 8:
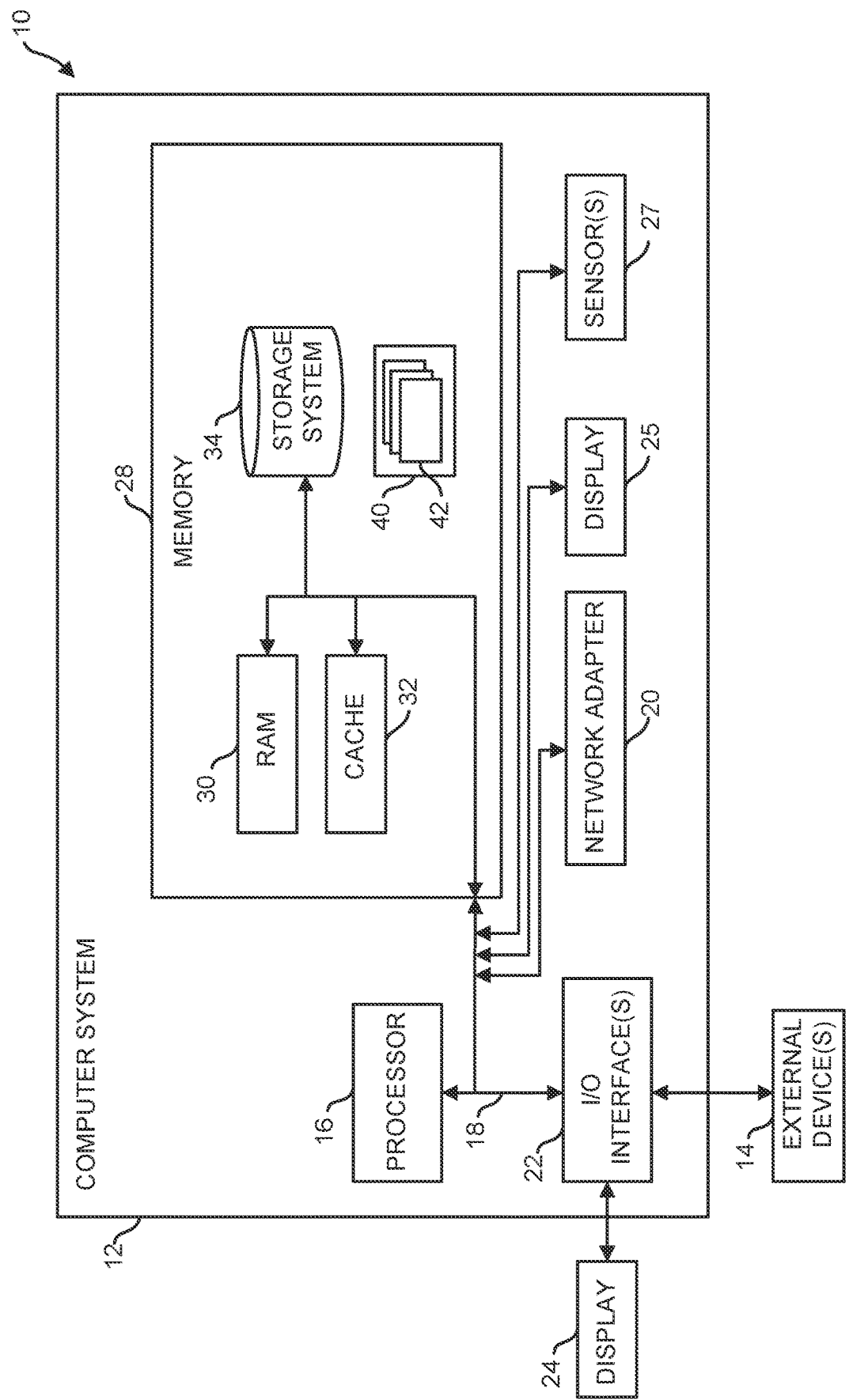
FIG. 8 depicts a computing node according to one embodiment.

DBMS 1400 running memory examination process 156 can iteratively examine logging data stored in data repository 138 specifying an amount of cache memory available for use in executing of a candidate query statement subject to evaluating by evaluation process 154. According to one embodiment, a computing node hosting database system 140 can run a system level process to log system data including such byte space currently available in cache memory 32 (FIG. 8). According to one embodiment, computing node hosting database system 140 can run cache managing software to iteratively log into logging area 3133 of data repository 138 data that specifies, in terms of available data storage bytes, a current amount of cache memory available for use by compiler process 150 and cache memory available for use in executing of a candidate query statement subject to evaluating by evaluation process 154. In one embodiment, DBMS 1400 can qualify a query statement transformation for further evaluation by evaluation process 154 on the determination, in response to query transformation processing, that there is sufficient cache memory for storage of a temporary table provided with use of a cross join operation. In one embodiment, DBMS 1400 can disqualify a query statement transformation from further evaluation by evaluation process 154 on the determination, in response to query transformation processing, that there is insufficient cache memory for storage of a temporary table provided with use of a cross join operation. Embodiments herein recognize that temporary tables provided with use of cross join operations can have table sizes that are readily ascertained by DBMS 1400, and therefore DBMS 1400, by examining logging data to compare available cache memory to table size, can readily determine whether there is sufficient cache memory for storage of a temporary table during execution runtime of a query statement.

In the performance of compiler process 150, DBMS 1400 can use data stored in data repository 138, which can be configured as a logical data repository. Data repository 138 can include keywords area 3131 for storing keywords, e.g., keywords specifying operators, clauses, expressions, identifiers, logical constants, referenced tables, and referenced table subelements including columns defining a query statement in the relevant query language for use by parsing process 151 in parsing an obtained query statement. Data repository 138 can also include decision data structures area 3132 for storing various decision data structures. Decision data structures of decision data structures area 3132 can be used, e.g., by evaluation process 154 for evaluating various candidate access paths and their associated candidate query statements, e.g., including an original obtained query statement and/or a transformed query statement output by transformation process 152. In logging area 3133, data repository 130 can store various logging data such as logging data that specifies an amount of cache memory 32 currently available for use by DBMS 1400. According to one embodiment, a computing node hosting database system 140 can run cache managing software to iteratively store system logging data into logging area 3133 that specifies a current amount of cache memory available for use in executing of a candidate query statement subject to evaluating by evaluation process 154 in terms of available storage bytes.

Figure 2:
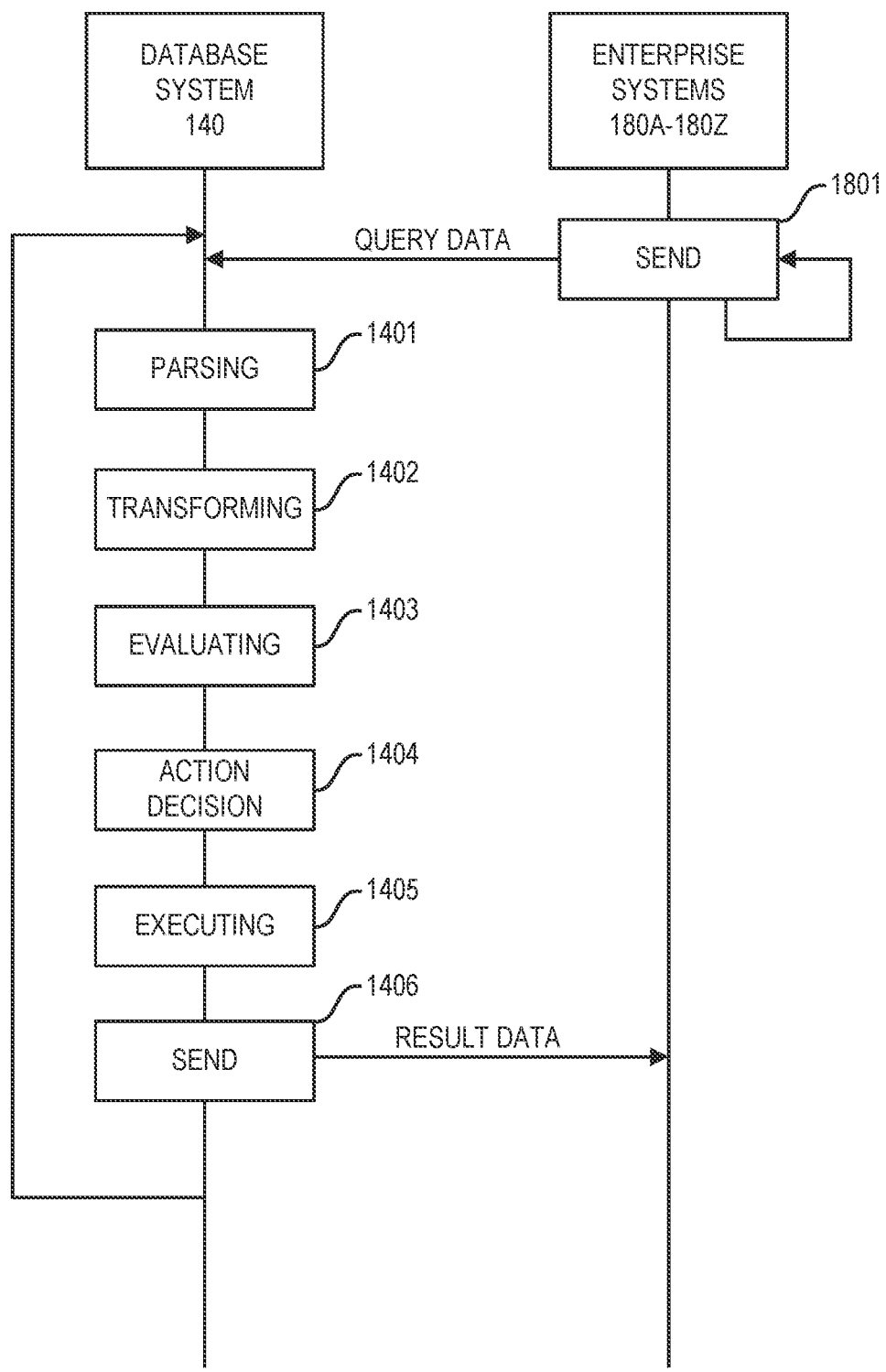
FIG. 2 is a flowchart illustrating a method for performance by a database management system according to one embodiment.

A method for performance by database system 140 interoperating with enterprise systems 180A-180Z is described in connection with the flowchart of FIG. 2. At block 1801, an enterprise system of enterprise systems 180A-180Z can be sending query data for handling by database system 140. The query data sent at block 1801 can include query data defining a query statement.

Upon obtaining the query statement in response to the sending at block 1801, database system 140 by DBMS 1400 can perform parsing at parsing block 1401. DBMS 1400 can run parsing process 151 to perform parsing block 1401. At parsing block 1401, DBMS 1400 can segment content of an obtained query statement to identify therein, e.g., keywords, operators, clauses, expressions, identifiers, logical constants, referenced tables, and referenced table subelements including columns. At parsing block 1401, DBMS 1400 can determine whether an obtained query statement includes compound predicates. A predicate in SQL refers to a true/false or unknown condition such as in a WHERE clause or a HAVING clause. Responsively to the determination at parsing block 1401 that an obtained query statement has compound predicates satisfying one or more specified criterion, DBMS 1400 can rewrite the obtained query statement to transform the query statement.

DBMS 1400 at instances of parsing block 1401 can be parsing incoming obtained query statements to identify elements of an incoming query statement, such as operations, clauses, and referenced tables. In one embodiment, DBMS 1400 at parsing block 1401 can parse an obtained query statement to identify that the obtained query statement includes compound (multiple) predicates. A predicate of the compound predicates can include, e.g., an IN LIST predicate (e.g., existential or non-existential) or a subquery predicate. Compound predicates can comprise multiple predicates that include, e.g., one or more IN LIST predicate and/or one or more subquery predicate.

In one embodiment, on the determination at parsing block 1401 that an obtained query statement includes compound predicates, DBMS 1400 can proceed to transforming block 1402. DBMS 1400 at transforming block 1402 can rewrite the compound predicate query statement to transform the obtained query statement.

In one embodiment, DBMS 1400 at parsing block 1401 can parse an obtained query statement having multiple non-existential IN LIST predicates and/or subquery predicates operational on a common base Table T. In one embodiment, DBMS 1400 at parsing block 1401 can parse an obtained query statement having multiple non-existential IN LIST predicates operational on a common base Table T. In one embodiment, on the identification of the query statement having multiple non-existential IN LIST predicates operational on a common Table T, DBMS 1400 can transform the obtained query statement to provide a transformed query statement. For transforming the obtained query statement, DBMS 1400 can specify performing a cross join using data values of the first non-existential IN LIST predicate and data values of the second non-existential IN LIST predicate to provide a temporary table X defining a Cartesian product. With providing of the temporary Table X specified, DBMS 1400 can specify providing an anti join of the original base table and the temporary table.

In response to completion of parsing block 1401, DBMS 1400 can proceed to transforming block 1402. At transforming block 1402, DBMS 1400 running transformation process 152 can rewrite the obtained query statement to transform the obtained query statement obtained in response to block 1801 into another form. When transforming the obtained query statement into another form, DBMS 1400 can transform generated semantic tree data structure for the obtained query statement into another form. The second form can be logically equivalent to the obtained query statement. By being logically equivalent, execution of the transformed query statement will provide a result equivalent to the result of executing the originally obtained query statement.

In the performance of transforming block 1402, DBMS 1400 can run a semantic analyzing process to analyze the incoming obtained query statement. DBMS 1400 at parsing block 1401 can identify elements of a query statement as set forth herein and add labels to such elements. DBMS 1400 running a semantic analyzing process can perform examining the labels assigned by performance of parsing block 1401 with reference to semantical rules defining a query language and can responsively validate the incoming query statement, or alternatively, reject the incoming query statement on the condition that the examining indicates that the incoming query statement is noncompliant with the semantical rules.

At transforming block 1402, DBMS 1400 running transformation process 152 can provide a semantic tree diagram representing the query statement obtained in response to send block 1801, in which the obtained query statement can be text based. The generated semantic tree data structure can include, e.g., nodes and edges, wherein nodes represent operations of a query statement and edges represent an order of execution between the operations. A computing node hosting database system 140, for rewriting an obtained text-based query statement at transforming block 1402, can change an attribute of one or more node and/or one or more edge of the semantic tree data structure. Embodiments herein recognize that rewriting for transformation of a query statement can be performed without rewriting of text-based data defining an incoming obtained text-based query statement. For example, DBMS 1400 can perform evaluation by evaluation process 154 and can perform query execution process 160 to execute a rewritten and transformed query statement with use of the described rewritten and transformed semantic tree data structure without rewriting of text defining a text-based query statement. It should be noted that expression of a transformed and rewritten query statement in terms of rewritten and transform text is not precluded. For example, logging data stored in logging area 3133 specifying rewritten transformed query statements can include transformed query statements expressed in rewritten text and user interface presented data for presentment to develop a user and can be presented in rewritten text. In some embodiments, evaluation process 154 and query execution process 160 can involve rewriting text of an obtained query statement to define a text-based query statement.

Figure 3:
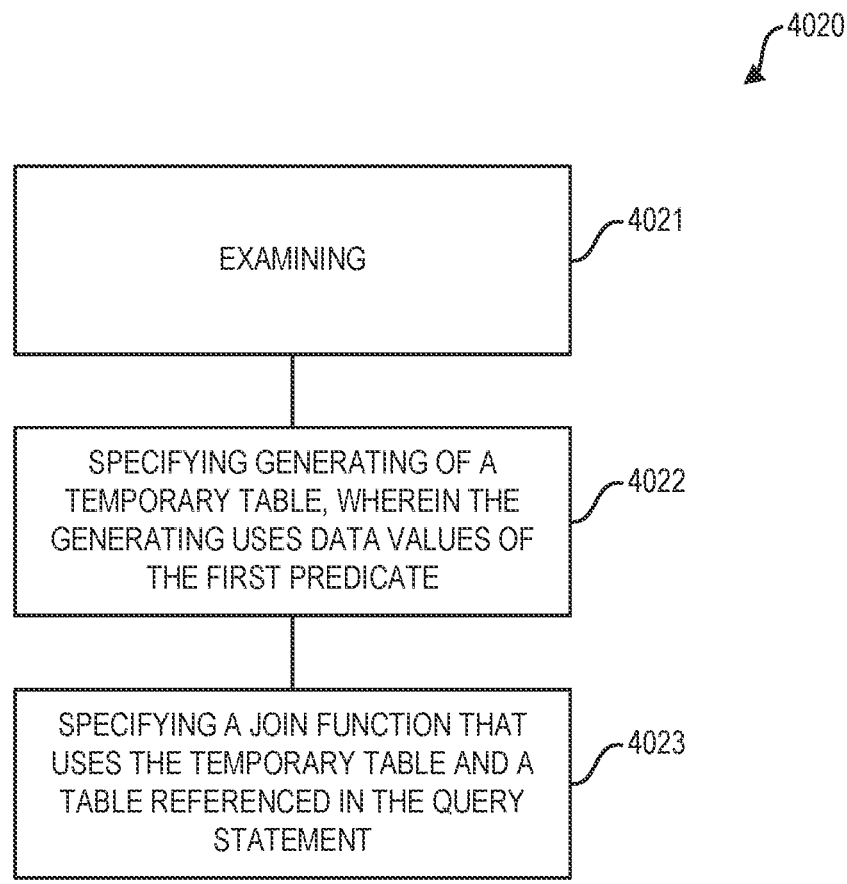
FIG. 3 is a flowchart illustrating a method for performance by a database management system according to one embodiment.

Further details of DBMS 1400 performing transforming block 1402, according to one embodiment, are described with reference to the flowchart of FIG. 3 illustrating method 4020 for performing transforming block 1402. At block 4022, DBMS 1400 can perform specifying generating of a temporary table, wherein the specified generating uses data values of the first predicate. In one specific example, according to block 4022, the specified generating can include generating a temporary table at block 4022 with use of a cross join, wherein a cross join is performed using data values of the first predicate and data values of the second predicate to define a Cartesian product. Rewriting for transformation of the obtained query statement can further include, at block 4023, specifying a join function that uses the temporary table specified in block 4022 with a table referenced in the obtained query statement subject to parsing at parsing block 1401. For rewriting of an obtained query statement, DBMS 1400 can specify generating a temporary table using a value associated to a predicate of the compound predicates of the obtained query statement. For specifying generating the temporary table, DBMS 1400 can perform a cross join using data values of at least one predicate of the compound predicate query statement to return a Cartesian product. For rewrite of an obtained predicate, DBMS 1400 can further perform a join function using the temporary table. The join function can include, e.g., an antijoin or a join operation. For rewrite of an obtained predicate, DBMS 1400 can perform a join function using the temporary table and a table referenced in the obtained query statement subject to parsing at parsing block 1401. The join function can include, e.g., an antijoin operation or a join operation.

Transforming at transforming block 1402 can, in one embodiment, include examining block 4021 as shown in the flowchart of FIG. 3. At examining block 4021, DBMS 1400 runs memory examination process 156 to examine logging data of logging area 3133 of data repository 138 for purposes of determining whether there is a sufficient amount of storage space available within cache memory 32 available for storage of a temporary table defined by a Cartesian product in executing of a candidate query statement subject to evaluating by evaluation process 154. DBMS 1400 can run memory examination process 156 in support of evaluation process 154. According to one embodiment, a computing node hosting database system 140 can run cache managing software to iteratively log a current amount of cache memory available for use in executing of a candidate query statement subject to evaluating by evaluation process 154 in terms of available storage bytes. The amount of available cache memory can dynamically change over time for new incoming query statements. In one example, DMBS 1400 can be handling multiple query statements concurrently. A number of factors can impact the amount of cache memory available for execution of a candidate query statements, including the number of query statements being handled and resource requirements for the query statements being handled.

In response to completion of transforming block 1402, DBMS 1400 can proceed to evaluating block 1403. At evaluating block 1403, DBMS 1400 can run evaluation process 154 to evaluate the plurality of candidate access paths associated to the plurality of candidate query statements generated at transforming block 1402. At transforming block 1402, DBMS 1400 can provide a plurality of candidate query statements for subsequent evaluation, wherein the respective generated candidate query statements can be associated to different candidate access paths, each respective access path associated to one of the query statements. In the generation of the transformed query statements, DBMS 1400 can define a set of candidate query statements where the candidate query statements include the original query statement and the transformed query statement.

At evaluating block 1403, DBMS 1400 can evaluate candidate access paths associated, respectively, to the query statement and the transformed query statement. According to one embodiment, DBMS 1400, for performing cost scoring associated with each of several candidate access paths, can score the total cost associated to each access path. According to one scoring method that can be applied, DBMS 1400, for assigning a total cost value to a candidate access path, can assign a CPU cost factor and an I/O cost factor. Subcomponents of a CPU cost factor can include, e.g., page cost, row cost, and scan cost. In some instances, transformation performed by transformation process 152 can reduce CPU cost, e.g., by reduction of page cost, row cost, and/or scan cost. In some instances, the transformed query statement, for reduction of scan cost, can reduce a number of scans associated to a base table, e.g., table scans and/or index scans, required for execution of a selected candidate query statement. At evaluating block 1403, DBMS 1400 can evaluate multiple variations of evaluated access paths. Variations can include, e.g., variations in regard to whether a temporary table specified for generation will be row organized (different rows assigned to separate pages) or, alternatively, column organized (different columns assigned to separate pages), variations in regard to indexes associated to one or more base table, or variations in the type of join to be performed e.g., hash join, nested loop, and the like.

In one embodiment, DBMS 1400 running memory examination process 156 in support of evaluation process 154 can qualify a transformed query statement for further evaluation by evaluation process 154, in response to query statement transformation processing, on the determination that there is sufficient storage space available in cache memory 32 available for storage of a temporary table defined by a Cartesian product provided with use of a cross join operation in executing of a candidate query statement subject to evaluating by evaluation process 154. In one embodiment, DBMS 1400 can disqualify a transformed query statement from further evaluation by evaluation process 154, in response to query statement transformation processing, on the determination that there is an insufficient storage space within cache memory 32 for storage of a temporary table defined by a Cartesian product provided with use of a cross join operation. Embodiments herein recognize that temporary tables provided with use of cross join operations can have table sizes that are readily ascertained by DBMS 1400, and therefore, DBMS 1400, by examining logging data of logging area 3133 to compare available storage space available in cache memory 32 to determine table size, can readily determine whether there is sufficient cache memory available for storage of a temporary table defined by a Cartesian product during execution runtime of a query statement. In the examining of logging data of logging area 2123 data specifying an amount of available storage space available in cache memory 32 in terms of available storage bytes, DBMS 1400 can be converting data specifying amount of available storage bytes into data specifying an amount (number) of available database pages. It can be seen that DBMS 1400 running memory examination process 156 in support of evaluation process 154 can disqualify a query statement transformation from further evaluation processing by evaluation process 154 prior to completing rewrite of a query statement transformation. For example, DBMS 1400, at an initial stage of rewrite for transformation of an obtained query statement, can perform memory examination process 156 and evaluation process 154 to determine that a size of a temporary table defined by a Cartesian product exceeds available storage space in cache memory 32 to disqualify a transformation and transformed query statement prior to completing rewriting of the transformed query statement associated to an obtained query statement.

On completion of evaluating block 1403, DBMS 1400 can proceed to action decision block 1403. At action decision block 1404, DBMS 1400 can select one of the evaluated candidate access paths as the access path for execution. At action decision block 1404, DBMS 1400 can select the lowest cost access path as determined by the performance of evaluating block 1403. On completion of evaluating block 1403, DBMS 1400 can proceed to block 1404. At action decision block 1404, DBMS 1400 can run action decision process 155 to provide an action decision in dependence on a result of performance of evaluation process 154. At action decision block 1404, DBMS 1400 can select one of the candidate access paths from the set of candidate access paths evaluated at block 1403 as the access path to be used in a subsequent execution runtime. At action decision block 1404, DBMS 1400 can select the lowest cost candidate access path and associated candidate query statement as the candidate access path and associated candidate query statement for execution.

At completion of action decision block 1404, DBMS 1400 can proceed to executing block 1405. At executing block 1405, DBMS 1400 can run query execution process 160 to execute the selected candidate query statement in accordance with the selected candidate access path selected at action decision block 1404. At executing block 1405, DBMS 1400 can execute the selected candidate query statement according to the selected candidate access path. Execution of a selected candidate query statement can include, e.g., row mode execution and/or batch mode execution.

On completion of executing block 1405, DBMS 1400 can proceed to send block 1406. At send block 1406, DBMS 1400 can send result data resulting from execution of the candidate query statement selected at block 1404 back to the enterprise system of enterprise systems 180A-180Z sending the query data at block 1801.

On completion of send block 1406, DBMS 1400 can return to a stage prior to parsing block 1401 so that DBMS 1400 can process a next received query statement defined by query data sent at an iteration of block 1801 by an enterprise system of enterprise systems 180A-180Z. DBMS 1400, at a stage prior to parsing block 1401, can be iteratively receiving new query data from a plurality of different enterprise systems of enterprise systems 180A-180Z, or alternatively, can be receiving query data defining query statements from a single enterprise system of enterprise systems 180A-180Z. Query data can be iteratively sent by enterprise systems 180A-180Z at block 1801. DBMS 1400 can be iteratively performing the loop of blocks 1401 to 1407 for handling different query statements obtained by DBMS 1400 in response to instances of send block 1801. DBMS 1400 can iteratively perform the loop of blocks 1401 to 1407 sequentially in different sequentially executed instances and/or can be performing different instances of the loop of block 1401 to 1407 contemporaneously and simultaneously in parallel processing stages.

Example 1 illustrates a use case in which DBMS 1400 obtains a query statement having multiple non-existential IN LIST predicates on a common base table.

EXAMPLE 1

Query statement (1) below can be obtained as follows in response to the sending at block 1801. select * from T where T.A NOT in (1,2,3,4) and T.B NOT in (5,6,7,8) (1)

In Example 1, Table T can be provided as shown in (2)

| T (2) | |
|---|---|
| A | B |
| 1 | 2 |
| 5 | 8 |
| 1 | 1 |
| 8 | 9 |

DBMS 1400 can (a) perform parsing block 1401 to identify first and second non-existential IN LIST predicates referencing first and second columns in base Table T. DBMS 1400 can transform the query statement of (1). For transforming the query statement of (1), DBMS 1400 can perform a cross join using the data values of first and second non-existential IN LIST predicates to specify generating a Temporary Table X (A, B) that is a Cartesian product of the data values of the non-existential IN LIST predicates. In one embodiment, DBMS 1400 can specify generating the described temporary table on the condition that columns are not nullable and have values of NULL. The specified output temporary Table X is as shown in (3).

| X (Cartesian product temporary table) (3) | |
|---|---|
| A | B |
| 1 | 5 |
| 1 | 6 |
| 1 | 7 |
| 1 | 8 |
| 2 | 5 |
| 2 | 6 |
| 2 | 7 |
| 2 | 8 |
| 3 | 5 |
| 3 | 6 |
| 3 | 7 |
| 3 | 8 |
| 4 | 5 |
| 4 | 6 |
| 4 | 7 |
| 4 | 8 |

For completion of the transformation of the incoming query statement, DBMS 1400 can specify performing an antijoin of the base Table T and the temporary Table X. An antijoin between two tables returns rows from the first table where no matches are found in the second table.

The antijoin can be expressed as the antijoin operation:

$$T_{(T.A,T.B),(X.A,X.B)} X \qquad (4)$$

In terms of SELECT statements, the antijoin can be expressed as: select from T where NOT EXISTS (select 1 from T where T.A=X.A or where T.B=X.B).

The query statement (1) and the transformed query statement (4) can produce logically equivalent results. On execution of both (1) and (4) the fourth row (8, 9) from Table T can be returned (equivalent results).

At evaluating block 1403, DBMS 1400 can evaluate access paths associated to the obtained query statement and the transformed query statement and can select the predicted best performing path at block 1405. For row organized execution, the temporary table can be stored as a Cartesian product. For column organized execution, the temporary table can be stored as column organized. Accordingly, each antijoin predicate can be executed against each column separately where the antijoin results are then combined. DBMS 1400 can execute the selected access path at executing block 1405.

End of Example 1

Figure 4:
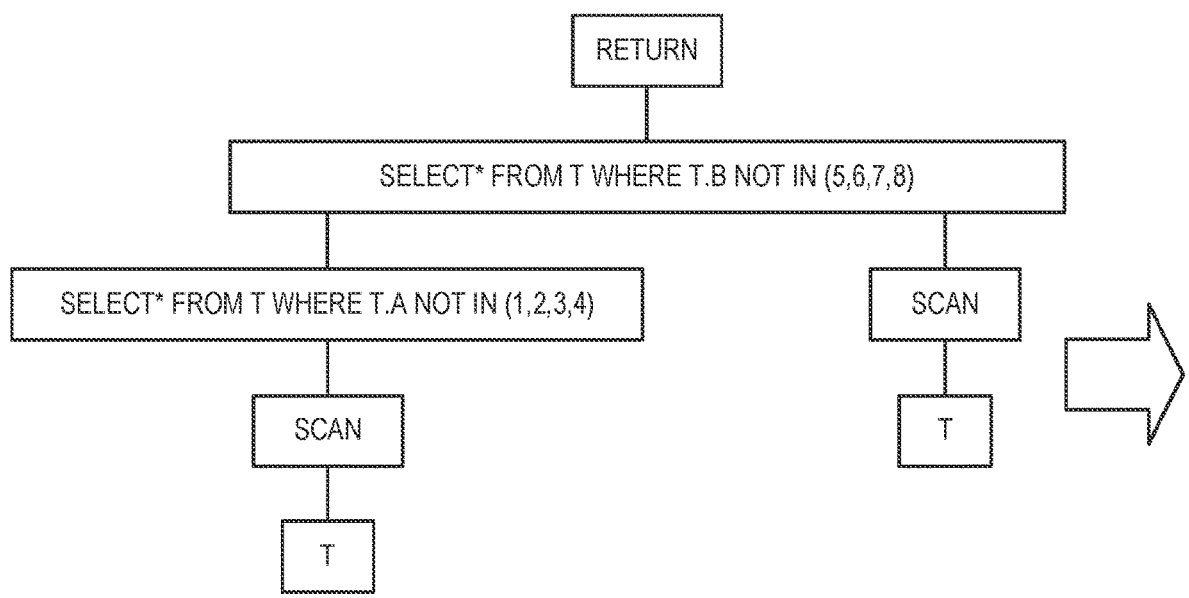
FIG. 4 depicts a data structure illustrating database management system operations according to a candidate access path according to one embodiment.
Figure 5:
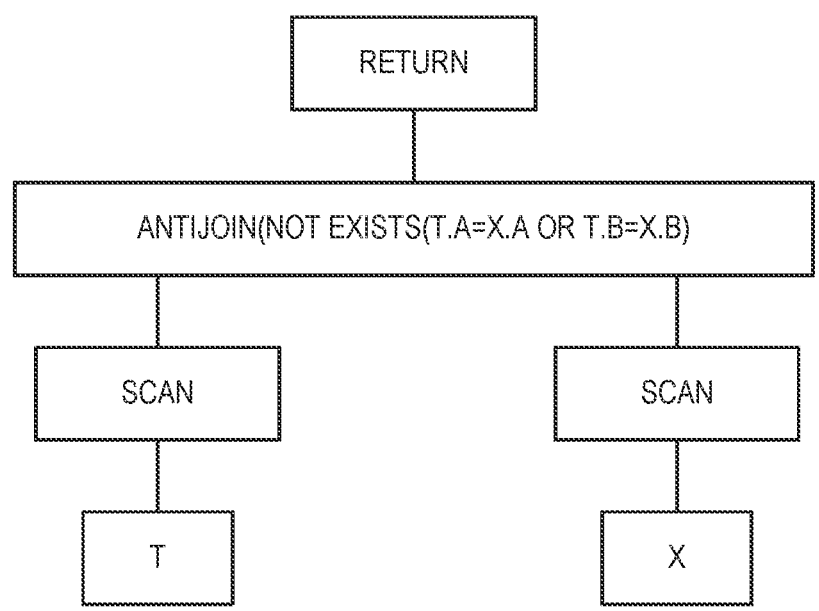
FIG. 5 depicts a data structure illustrating database management system operations according to a candidate access path according to one embodiment.

Referring to Example 1, the described method can reduce numbers of operations and therefore reduce resource consumption. Comparing (4) to (1), the numbers of operations are reduced from two antijoin non-existential IN LISTs (requiring two scans of a base table) to a single join operation involving a single scan of a base table. FIG. 4 depicts a data structure illustrating operations of an access path associated to the obtained query statement (1) of Example 1, and FIG. 5 depicts a data structure illustrating operations of an access path associated to the transformed query statement (4) of Example 1. The illustrated access paths of FIG. 4 and FIG. 5 show that the transformed query statement can improve table access efficiencies. Referring to FIG. 4, a table scan of Table T can include first and second predicates applied sequentially where Table T is provided as a leaf of a tree in a tree data structure. Embodiments herein recognize that where the filtering performed sequentially by the first predicate and sequentially the second predicates is undesirably small, orchestrator 110 can pass an undesirably large number of rows between the predicate processing.

Referring to FIG. 5, orchestrator 110 can combine first and second in-lists for a non-existential ANTIJOIN evaluation, which can produce combined filtering that filters an increased number of rows, leading to an access path including a cartesian product that can be evaluated to be cheaper than the access path depicted in FIG. 4. In both the cases depicted in FIG. 4 and FIG. 5, orchestrator 110 can scan T only once. In some use cases, as determining by evaluating performed by orchestrator 110, the transformed query statement having the access path depicted in FIG. 5 can provide processing of fewer rows and potential use of an index for with the ANTIJOIN on the cartesian product, resulting in a lower cost access path.

In one embodiment, DBMS 1400 at parsing block 1401 can parse an obtained query statement having compound predicates, wherein the compound predicates are provided by multiple existential IN LIST predicates. Example 2 illustrates a use case in which an obtained query statement parsed at parsing block 1401 includes compound predicates, wherein the compound predicates are provided by multiple existential IN LIST predicates.

EXAMPLE 2

At block 1401, DBMS 1400 can obtain a query statement as shown in (5).

select*from $T$ where $T.A$ in (1,2,3,4) and $T.B$ in (5,6, 7,8)  (5)

At parsing block 1401, DBMS 1400 can identify that the obtained query statement includes compound predicates. At parsing block 1401, DBMS 1400 can identify that the obtained query statement includes compound predicates provided by multiple existential IN LIST predicates. In response to the determination that the query statement includes compound predicates, DBMS 1400 can proceed to transforming block 1402. At transforming block 1402, DBMS 1400 can rewrite the query statement of (5) to provide a transformed query statement. For rewriting the query statement, DBMS 1400 can specify generating a temporary Table X using values associated to at least one of the predicates of the query statement. For specifying generating the temporary Table X, DBMS 1400 can perform a cross join using values associated to at least one predicate of the obtained query statement to return a compound predicate. For specifying generating the temporary Table X, DBMS 1400 can perform a cross join using values associated to first and second IN LIST predicates of the obtained query statement to return a compound predicate.

For rewriting the obtained query statement at transforming block 1402, DBMS 1400 at transforming block 1402 can provide a temporary Table X (A, B) that is a Cartesian product of the values specified in the IN LIST predicates. For rewriting the obtained query statement at transforming block 1402, DBMS 1400 at transforming block 1402 can perform a join function using the temporary Table X. For rewriting the obtained query statement at transforming block 1402, DBMS 1400 at transforming block 1402 can perform a join function using the temporary table X and a table referenced in the obtained query statement of (5), namely the referenced Table T.

DBMS 1400 performing transforming at transforming block 1402 can provide a rewritten query as shown in (6).

```
select * from T,
(select * from
  VALUES((1,5),(1,6),(1,7),(1,8),(2,5),(2,6),(2,7),(2,8),(3,5),(3,6),(3,7),(3,8),(4,5),(4,6),(4,7),(4,8))
  as X(A,B)
  where T.A=X.A and T.B=X.B      (6)
```

In (6), the expression (select * from VALUES ((1,5), (1,6), (1,7), (1,8), (2,5), (2,6), (2,7), (2,8), (3,5), (3,6), (3,7), (3,8), (4,5), (4,6), (4,7), (4,8)) as X(A,B), expresses a cross join of the first set of values and the second set of values, respectively, in the respective IN LIST predicates of the query statement of (5). In (6), the clause T.A=X.A and T.B=X.B expresses a join function provided by a JOIN operation between the base table referenced in the query statement of (5) and the temporary Table X, produced using values associated to a predicate of the query statement. At evaluating block 1403, DBMS 1400 can evaluate candidate access paths associated to the candidate query statements of (5) and (6) and, at action decision block 1404, can select the candidate access path associated to the rewritten query statement of (6). At executing block 1405, DBMS 1400 can execute the selected candidate query statement of (6) according to its selected candidate access path.

At evaluating block 1403, DBMS 1400 can evaluate access paths associated to the obtained query statement and the transformed query statement and can select the predicted best performing path at block 1405 as determined by the evaluating. For row organized execution, the temporary table can be stored as a Cartesian product. For column organized execution, the temporary table can be stored as column organized. Accordingly, each antijoin predicate can be executed against each column separately where the antijoin results are then combine▷DBMS 1400 can execute the selected access path at executing block 1405.

End of Example 2

According to another example, the multiple respective IN LIST predicates can be rewritten as JOIN operations separately. Example 2 shows that with the transformation to query statement (6), only one join operation can be handled instead of multiple joins in the case the IN-LISTs are rewritten separately. Storage of the temporary Table X, as described in Example 2 as column organized, can allow parallel join predicates per temporary table column. Further with reference to Example 2, one join can facilitate using one index on the base table side if relational or potentially synopsis. Further with reference to Example 2, one join can facilitate using indexes per column if the base table was column organized.

In one embodiment, DBMS 1400 at parsing block 1401 can parse an obtained query statement having compound predicates, wherein the compound predicates are provided by multiple subqueries. On the identification of the query statement having multiple subqueries, DBMS 1400 can transform the obtained query statement to provide a transformed query statement. Example 3 illustrates a use case in which DBMS 1400 obtains a query statement having compound predicates provided by multiple subqueries.

EXAMPLE 3

Query statement (7) below can be obtained as follows in response to the sending at block 1801 and can be subject to parsing at parsing block 1401.

```
select * from T where T.A NOT in (select C from S
  where S.D=5) and NOT EXISTS (select 1 from
  U where T.B=U.E AND U.F>10)      (7)
```

On the identification of first and second predicates defined by subqueries at parsing block 1401, DBMS 1400 at transforming block 1402 can transform the query statement of (7). For providing a rewritten query statement, DBMS 1400 can specify generating a temporary Table P with use of a cross join that uses data values of and associated to at least one of the subqueries. For providing a rewritten query statement, DBMS 1400 can specify generating a temporary Table P with use of a cross join that uses data values of respective ones of the subqueries defining the obtained query statement. In the rewritten transformed form, DBMS 1400 can specify generating a temporary Table P with use of a cross join to define a Cartesian product as follows:

```
(select W.C, Z.E from (select C from S where
  S.D=5) as W, (select E from U where U.F>10)
  as Z) as P(C,E).      (8)
```

With the temporary Table P specified for generation, DBMS 1400 can specify performing a join function using the generated temporary table and a table referenced in the query statement. The join function can be an antijoin operation:

$$T \ _{(T.A,T.B) \bowtie (P.C,P.E)} P \qquad (9)$$

At evaluating block 1403, DBMS 1400 can evaluate candidate access paths associated to the candidate query statements of (7) and (9) and, at action decision block 1404, can select the candidate access path associated to the rewritten query statement of (9). At block 1405, DBMS 1400 can execute the selected candidate query statement of (9) according to its selected candidate access path.

End of Example 3

Figure 6:
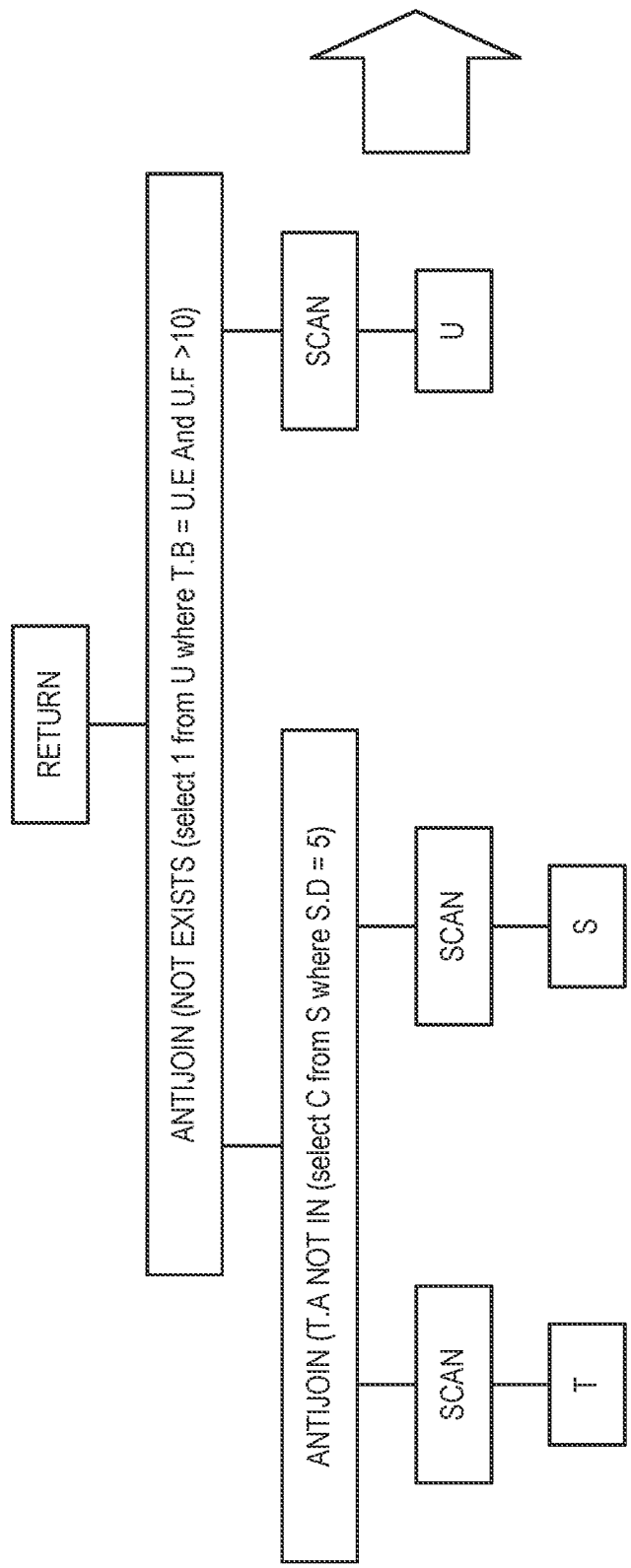
FIG. 6 depicts a data structure illustrating database management system operations according to a candidate access path according to one embodiment.
Figure 7:
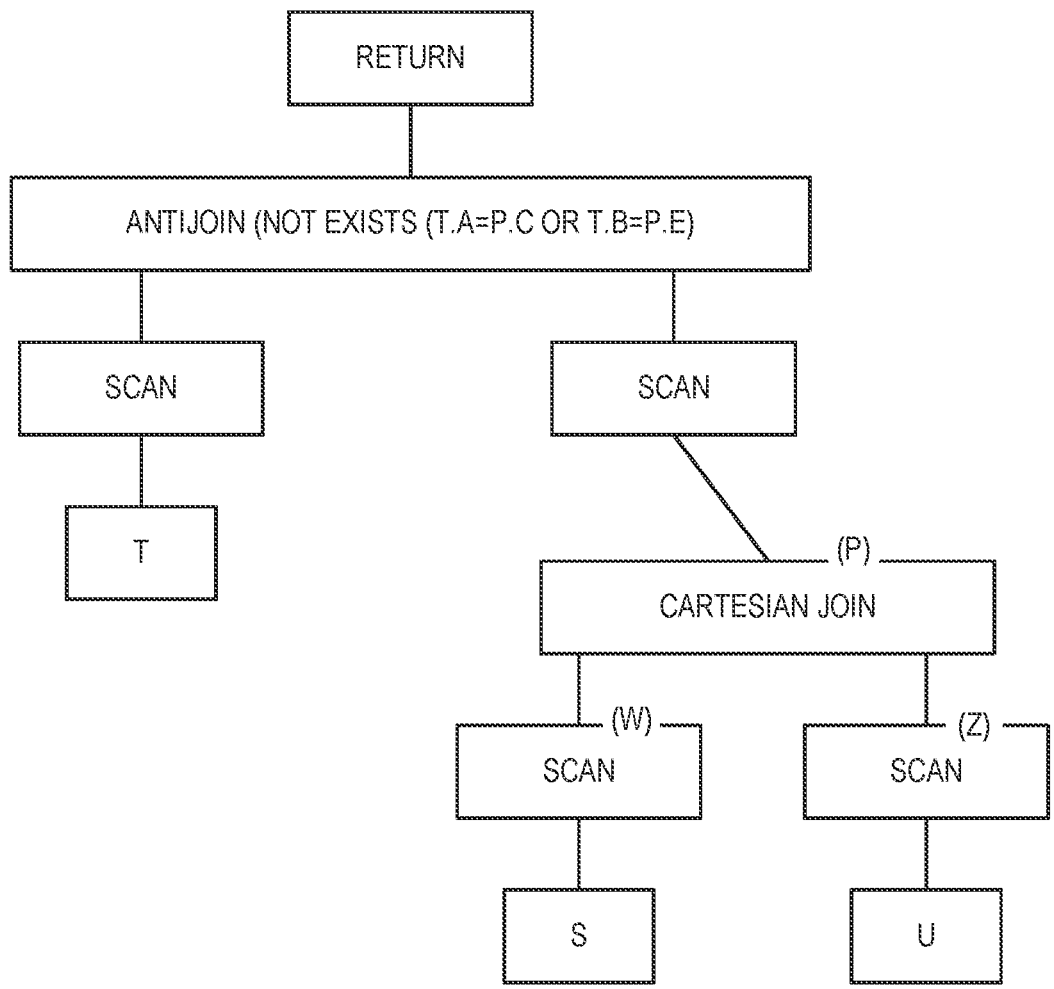
FIG. 7 depicts a data structure illustrating database management system operations according to a candidate access path according to one embodiment.

In Example 3, data values of a predicate are provided by returned result data of subquery predicates rather than IN LIST predicates. Example 3 shows that rewrite for transformation of the obtained query statement of (7) to (9) can improve performance of database system 140. FIG. 6 depicts a data structure illustrating operations of an access path associated to the obtained query statement (7) of Example 3, and FIG. 7 depicts a data structure illustrating operations of an access path associated to the transformed query statement (9) of Example 3. The depicted access paths of FIG. 6 and FIG. 7 show that the transformed query statement can reduce the number of scans of a base table, e.g., table scans of a base table or index scans of a base table, associated to execution of a selected access path. The illustrated access paths of FIG. 6 and FIG. 7 show that the transformed query statement can reduce the number of antijoin operations performed from two to one. The illustrated access paths of FIG. 6 and FIG. 7 show that the transformed query statement can improved table access efficiencies. Referring to FIG. 6, without transformation, an access path can include multiple accesses of the Table T, with the lower antijoin accessing Table T, and the upper antijoin also accessing Table T, after potentially a minimal number rows are filtered by the lower antijoin. Referring to FIG. 7, with transformation, an access path can include a single access of Table T.

Referring to Example 1 and Example 3, only one antijoin operation needs to be handled instead of multiple antijoins where each INLIST and subquery predicates are rewritten separately. Further with reference to Example 1 and Example 3, storage of a temporary table as column organized can permit parallel antijoin predicates per temporary table column. Further with reference to Example 1 and Example 3, one antijoin can facilitate using one index on the base table side if relational or potentially synopsis. Further with reference to Examples 1 and Example 3, one antijoin can facilitate using one index on the base table side if relational or potentially synopsis. Further with reference to Example 1 and Example 3, one antijoin can facilitate using indexes per column if the base table was column organized. Embodiments herein can facilitate additional candidate query statements and associated candidate access paths and, accordingly, can facilitate a selected candidate access plan having improved performance.

Example 4 illustrates a use case in which DBMS 1400 obtains a query statement having compound predicates provided by first, second, and third predicates.

EXAMPLE 4

Query statement (10) can be obtained as follows in response to the sending at block 1801 and can be subject to processing at parsing block 1401.

select*from $T$ where $T.A$ NOT in (1, 2, 3, 4) and
NOT EXISTS (select 1 from $U$ where $T.B=U.E$
AND $U.F>10$) and $T.0$ NOT in (5,6,7,8)   (10)

Query statement (10) has first, second, and third predicates, the first predicate being a non-existential IN LIST predicate, the second predicate being a subquery predicate, and the third predicate being a non-existential IN LIST predicate. On the identification of first and second predicates defined by subqueries, DBMS 1400 can rewrite the obtained query to transform the query statement of (10). For providing a rewritten query statement to transform query statement (10), DBMS 1400 can provide multiple rewritten and transformed query statements. Multiple options are possible. DBMS 1400 can specify the generation of a temporary Table P with use of data values associated to at least one of the subqueries. For providing a rewritten query, DBMS 1400 can specify the generation of (a) a first rewritten query statement that performs a cross join using data values of the first, second, and third predicates to provide a temporary table, which is then subject to an antijoin with one or more referenced table of the obtained query statement, (b) a second rewritten query statement that performs a cross join using data values of the first and second predicates to provide a temporary table, which can then be subject to an antijoin with one or more referenced table of the obtained query statement, (c) a third rewritten query that performs a cross join using data values of the first and third predicates to provide a temporary table, which is then subject to an antijoin with one or more referenced table of the obtained query statement, and (d) a fourth rewritten query that performs a cross join using data values of the second and third predicates to provide a temporary table, which is then subject to an antijoin with one or more referenced table of the obtained query statement. DBMS 1400 can be subject to evaluation by evaluation process 154 access paths associated to the first, second, third, and fourth rewritten and transformed query statements as candidate query statements, with the obtained query statement (10).

In one example, DBMS 1400 at evaluating block 1403 can determine that the cross join Cartesian product produced by third rewritten query statement fits in cache memory 32 and that the cross join Cartesian product produced by the first, second, and fourth query statements does not fit into cache memory 32. Thus, DBMS 1400 can qualify the third written query statement for further evaluation as candidate query statement and can disqualify the first, second, and fourth query statements for further evaluation as a candidate query statement.

End of Example 4

Example 4 illustrates that query statements having any number of predicates dispersed therein with associated data values (such as non-existential IN LIST predicate data values or subquery predicate results data values) can be subject to processing to produce multiple candidate query statements for evaluation as the selected query statement for execution according to an associated access path. In one embodiment, depending on a result of an evaluation by evaluation process 154, any one of the candidate query statements (which can include the original obtained query statement) can be selected for execution.

Embodiments herein can provide a rewrite rule that can merge data values of multiple (two or more) predicates (e.g., non-existential IN LIST or NOT EXISTS subquery predicates) together into one temporary table and have one antijoin in the rewrite. In this rule, the non-existential IN LIST or NOT EXISTS subquery predicates can initially be against the same base table and thus lead to combining these in-lists and/or subqueries in the predicates to form a temporary table that will be used to execute one antijoin for the query. Embodiments herein recognize that if the query statement has one or more "NOT IN <in-list>" predicate (or "NOT IN subquery" predicate or "NOT EXIST subquery") on the same base table used on the left-hand side of the predicates, existing approaches for rewrites for one predicate at a time may not be optimal. Embodiments herein recognize that each predicate would be rewritten one at a time independent of the other related predicates on the same base table and result in more operations and more tuples being processed than may be necessary. Embodiments herein can merge predicates of a multiple predicate query statement such that IN LIST predicates and/or transformed subquery predicates that define the multiple predicates can be formed into a cross product (e.g., perform a cross join to define a Cartesian product between data values of the IN LIST predicates and/or subquery predicates), where this would form a new temporary table (called S) which can be used with the original common base table in the predicates (called R) to provide one antijoin defining an antijoin.

For example, if the obtained query statement is: "select * from T where T.A NOT in (1,2,3,4) and T.B NOT in (5,6,7,8)", DBMS 1400 can rewrite the query statement to provide a cross product (also called cross join or Cartesian product) of the non-existential IN LIST predicates and then use that result as the right-hand side of an antijoin with Table T. For example, DBMS 1400 can provide a new Table X with columns A and B as (1,2,3,4)×(5,6,7,8) where A are values from the first IN LIST and B are values from the second IN LIST. This could also be rewritten as: "(select Z(A), Y(B) from VALUES(1,2,3,4) as Z(A), VALUES(5,6,7,8) as Y(B)) as X(A,B)". Then, DBMS 1400 can change the query to form one antijoin as: $T_{(T.A,T.B),(X.A,X.B)}X$. Embodiments herein recognize that less antijoins and operations are potentially required for this single antijoin query execution plan and would potentially be more efficient. The described method can be performed with any number of non-existential IN LIST and NOT EXISTS subquery predicates in general.

Embodiments herein can rewrite a query statement that can take multiple (2 or more) non-existential IN LIST or NOT EXISTS predicates against the same table and merge the IN LISTs and/or transformed subqueries into one temporary table using a Cartesian product, where it would then be used in an antijoin with the base table instead of applying the individual predicates, and also instead of performing multiple antijoin operations.

In one embodiment, DBMS 1400 can obtain the query statement: "select * from T where T.A NOT in (1,2,3,4) and T.B NOT in (5,6,7,8)". Embodiments herein can take the non-existential IN LIST predicates and form a temporary table that is a Cartesian product of the IN LIST data values. Then DBMS 1400 can specify an antijoin using the base table and the new temporary table.

For rewriting the query statement, DBMS 1400 can first specify the cross join: "(select * from VALUES((1,5),(1,6), (1,7),(1,8),(2,5),(2,6),(2,7),(2,8), (3,5),(3,6),(3,7),(3,8),(4,5),(4,6),(4,7),(4,8)) as X(A,B)". Then, DBMS 1400 can specify the antijoin using a base table and the temporary table: $T_{(T.A,T.B),(X.A,X.B)}X$.

Embodiments herein recognize that if the Cartesian product is small enough, DBMS 1400 can provide a hash antijoin (HS-ANTIJOIN) execution plan. DBMS 1400 can first take the temporary table to make a hashed table with hashing columns that are the columns to be used in the predicate of the antijoin. The goal is to have this hashed table fit in cache memory 32, where each row of the temporary table would hash to a unique hash bucket. DBMS 1400 can use original base Table T as the probe table on the hash table such that every row of T would have its A and B values give a hash key and thus, DBMS 1400 can check if that hash key is in the hash table. If the hash key from T is not found in the hashed table, then DBMS 1400 can be guaranteed to include that tuple of T as part of the antijoin. Even if there is a match in the hashed table on the hash key from a tuple of T, DBMS 1400 can still look into the possible values of (A,B) in tuples of the bucket for that hash key in the hashed table formed from the temporary Table X, and if no match is found, then the tuple of T would also be in the antijoin result since it would be guaranteed that no rows in X match with T on the antijoin columns.

Another example is a query statement such as: "select * from T where T.A NOT in (select C from S where S.D=5) and T.B NOT in (select E from U where U.F>10)". In the rewritten form, DBMS 1400 can form a cross product with the two subqueries such as: "(select W.C, Z.E from (select C from S where S.D=5) as W, (select E from U where U.F>10) as Z) as P(C,E)". For transformation of the described query statement, DBMS 1400 can associate every tuple of W with every one of Z, which would provide the cross product of the subqueries in a temporary table P. Then DBMS 1400 can specify the antijoin: $T_{(T.A,T.B),(P.C,P.E)}P$. Embodiments herein recognize that additional predicates of the described forms can be added to make a larger cross product temporary table as well before the rewritten antijoin for more general query.

Figure 9:
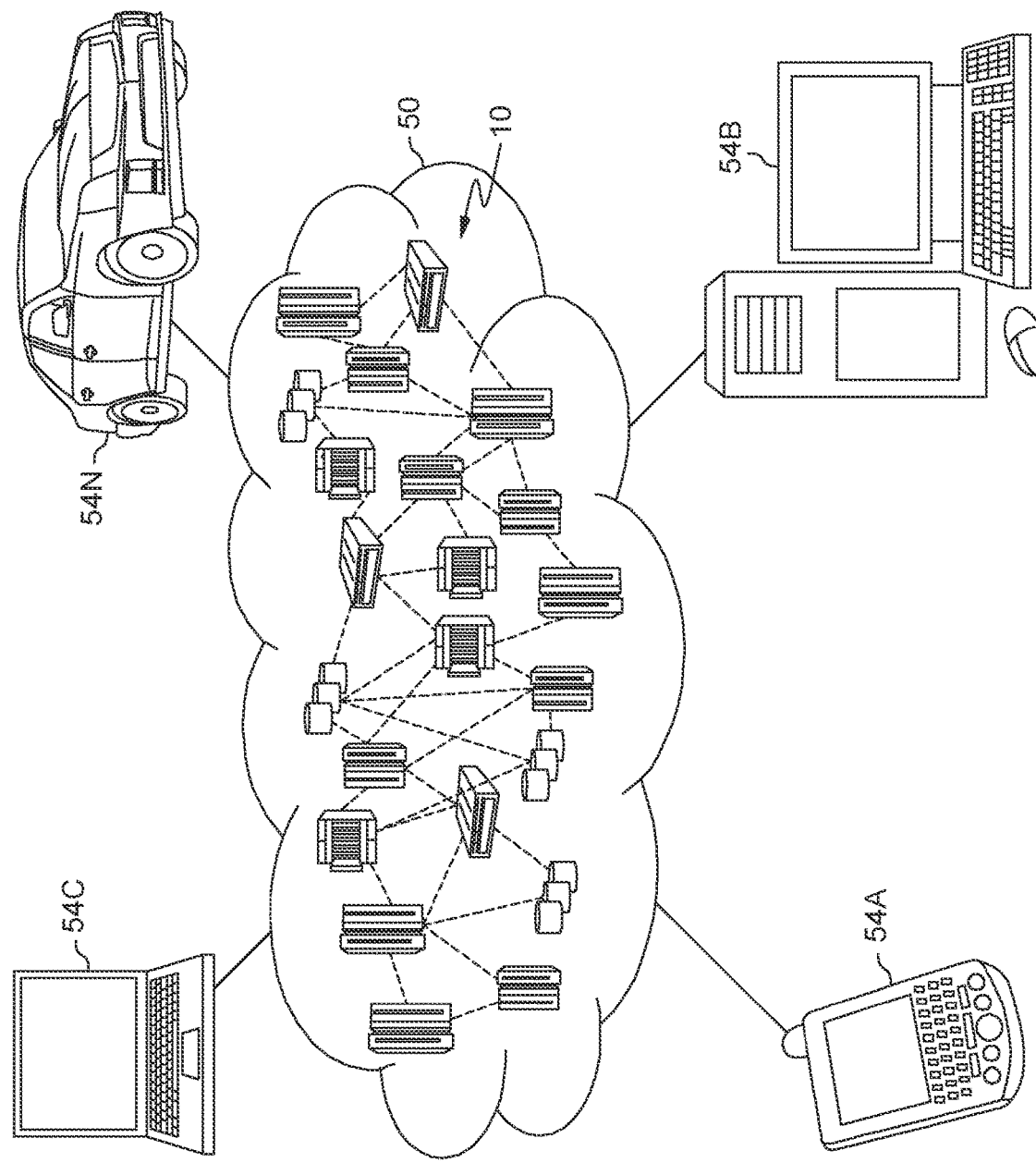
FIG. 9 depicts a cloud computing environment according to one embodiment.
Figure 10:
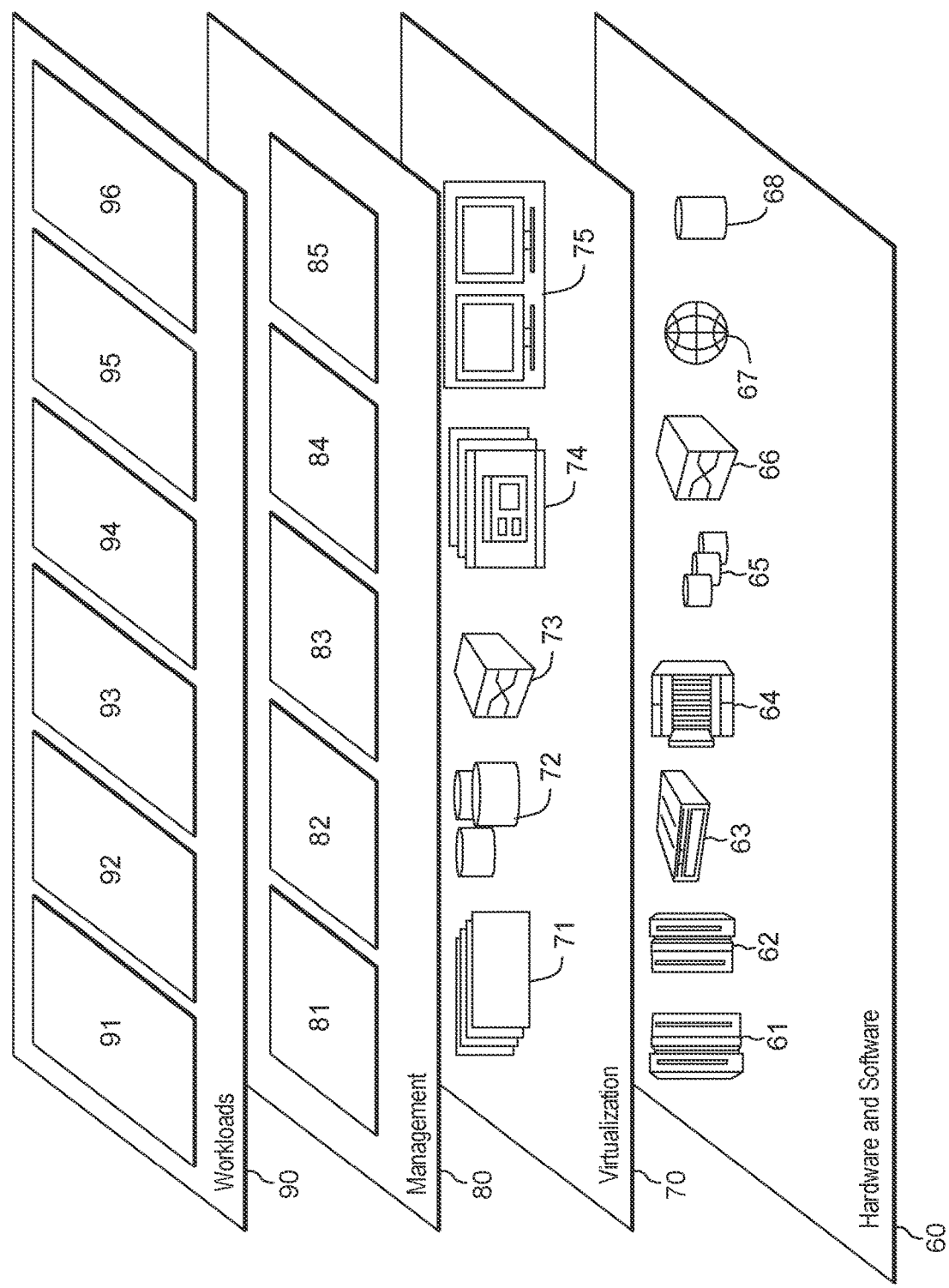
FIG. 10 depicts abstraction model layers according to one embodiment.

Certain embodiments herein may offer various technical computing advantages involving computing advantages to address problems arising in the realm of computer systems. Embodiments herein can improve the functioning of database systems. For example, an obtained query statement can be subject to parsing and in response to the parsing can be rewritten for transformation of the obtained query statement. Rewriting of the query statement can include specifying a temporary table wherein generation of the temporary table includes using data values of a predicate of the obtained query statement. Specifying generating the temporary table can include performing a cross join using data values of the first predicate and a second predicate of the obtained query statement. Rewriting for transformation of an obtained query statement can also include performance of a join function such as an antijoin operation that uses the temporary table and a table referenced in the obtained query statement. Candidate access paths associated to the obtained query statement and the transformed query statement can be subject to cost evaluation for determining a lowest cost candidate access path, which can be selected for execution. Methods herein can speed performance of database system and can reduce consumption of computing resource, e.g., processing and memory resources. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, DBMS 1400 can include one or more computing node 10 and can include one or more program 40 for performing functions described with reference to DBMS 1400 as set forth in the flowchart of FIG. 2 and the flowchart of FIG. 3. In one embodiment, DBMS 1400 can include one or more computing node 10 and can include one or more program 40 for performing functions described with reference to DBMS 1400 as set forth in reference to the operations illustrated in the data structures depicted in FIGS. 4-7. In one embodiment, enterprise systems 180A-180Z can include one or more computing node 10 and can include one or more program 40 for performing functions described with reference to enterprise system 180A-180Z as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining a query statement;
    parsing the query statement and determining from the parsing that the query statement is a compound predicate query statement that includes a first predicate and a second predicate;
    responsively to the parsing, rewriting the obtained query statement to provide a transformed query statement, wherein the rewriting includes (a) specifying generating of a temporary table, wherein the specified generating uses data values of the first predicate and (b) specifying an antijoin operation that uses the temporary table and a table referenced in the query statement;
    evaluating a candidate access path associated to the transformed query statement;
    selecting the candidate access path as an access path for execution; and
    executing the transformed query statement according to the selected candidate access path for execution.

2. The computer implemented method of claim 1, wherein the first predicate is a first non-existential IN LIST predicate, and wherein the second predicate is a second non-existential IN LIST predicate.

3. The computer implemented method of claim 1, wherein the first predicate is an IN LIST predicate, wherein the second predicate is an IN LIST predicate.

4. The computer implemented method of claim 1, wherein the first predicate is an IN LIST predicate, wherein the second predicate is a subquery predicate.

5. The computer implemented method of claim 1, wherein the first predicate is a first subquery predicate and wherein the second predicate is a second subquery predicate.

6. The computer implemented method of claim 1, wherein the specifying generating of the temporary table includes specifying performing a cross join using data values of the first predicate and data values of the second predicate to define a Cartesian product.

7. The computer implemented method of claim 1, wherein the specifying generating of the temporary table includes specifying performing a cross join using data values of the first predicate and data values of the second predicate to define a Cartesian product, wherein the first predicate and the second predicate reference a common table.

8. The computer implemented method of claim 1, wherein the specifying an antijoin operation that uses the temporary table and a table referenced in the query statement includes specifying an antijoin that uses the temporary table and a common table commonly referenced in the first predicate and the second predicate.

9. The computer implemented method of claim 1, wherein the specifying generating of the temporary table includes specifying performing a cross join using data values of the first predicate and data values of the second predicate to define a Cartesian product, wherein the first predicate and the second predicate reference a common table, and wherein the specifying an antijoin operation that uses the temporary table and a table referenced in the query statement includes specifying an antijoin that uses the temporary table and the common table.

10. The computer implemented method of claim 1, wherein the first predicate is a first non-existential IN LIST predicate, and wherein the second predicate is a second non-existential IN LIST predicate, wherein the specifying generating of the temporary table includes specifying performing a cross join using data values of the first non-existential IN LIST predicate and data values of the second non-existential IN LIST predicate to define a Cartesian product, wherein the first predicate and the second predicate reference a common table, and wherein the specifying an antijoin operation that uses the temporary table and a table referenced in the query statement includes specifying an antijoin that uses the temporary table and the common table.

11. The computer implemented method of claim 1, wherein the first predicate is a first subquery predicate and wherein the second predicate is a second subquery predicate, wherein the specifying generating of the temporary table includes specifying performing a cross join using data values of the first subquery predicate and data values of the second subquery predicate to define a Cartesian product.

12. The computer implemented method of claim 1, wherein the evaluating includes examining logging data of a data repository to determine an amount of storage space available in a cache memory for storage of the temporary table, determining a size of the temporary table, comparing the determined amount of storage space available in a cache memory for storage of the temporary table to the determined size of the temporary table, ascertaining based on the comparing that there is sufficient storage space in the cache memory for storage of the temporary table, and qualifying the transformed query statement for further evaluation processing by the evaluating responsively to the ascertaining based on the comparing that there is sufficient storage space in the cache memory for storage of the temporary table.

13. The computer implemented method of claim 1, wherein the specifying generating of the temporary table includes specifying performing a cross join using data values of the first predicate and data values of the second predicate to define a Cartesian product, wherein the evaluating includes examining logging data of a data repository to determine an amount of storage space available in a cache memory for storage of the temporary table, determining a size of the temporary table, comparing the determined amount of storage space available in a cache memory for storage of the temporary table to the determined size of the temporary table, ascertaining based on the comparing that there is sufficient storage space in the cache memory for storage of the temporary table, and qualifying the transformed query statement for further evaluation processing by the evaluating responsively to the ascertaining based on the comparing that there is sufficient storage space in the cache memory for storage of the temporary table.

14. The computer implemented method of claim 1, wherein the first predicate is a first non-existential IN LIST predicate, and wherein the second predicate is a second non-existential IN LIST predicate, wherein the specifying generating of the temporary table includes specifying performing a cross join using data values of the first non-existential IN LIST predicate and data values of the second non-existential IN LIST predicate to define a Cartesian product, wherein the first predicate and the second predicate reference a common table, and wherein the specifying an antijoin operation that uses the temporary table and a table referenced in the query statement includes specifying an antijoin that uses the temporary table and the common table, wherein the evaluating includes examining logging data of a data repository to determine an amount of storage space available in a cache memory for storage of the temporary table, determining a size of the temporary table, comparing the determined amount of storage space available in a cache memory for storage of the temporary table to the determined size of the temporary table, ascertaining based on the comparing that there is sufficient storage space in the cache memory for storage of the temporary table, and qualifying the transformed query statement for further evaluation processing by the evaluating responsively to the ascertaining based on the comparing that there is sufficient storage space in the cache memory for storage of the temporary table.

15. The computer implemented method of claim 1, wherein the method includes obtaining a subsequent query statement, performing transformation processing for transforming the subsequent query statement into a transformed subsequent query statement, wherein the performing transformation processing includes specifying providing of a generated temporary table by cross joining data values of first and second predicates of the subsequent query statement, examining logging data of a data repository to determine an amount of storage space available in a cache memory for storage of the generated temporary table, determining a size of the generated temporary table, comparing the determined amount of storage space available in a cache memory for storage of the generated temporary table to the determined size of the generated temporary table, ascertaining based on the comparing that there is insufficient storage space in the cache memory for storage of the generated temporary table, and disqualifying the transformed subsequent query statement for further evaluation processing to determine whether to execute the transformed subsequent query statement responsively to the ascertaining based on the comparing that there is insufficient storage space in the cache memory for storage of the generated temporary table.

16. The computer implemented method of claim 1, wherein the parsing includes parsing the query statement and determining from the parsing that the query statement is a compound predicate query statement that includes the first predicate, the second predicate and a third predicate; responsively to the parsing, rewriting the obtained query statement to provide first and second transformed query statement, wherein the rewriting includes (a) specifying generating of a first temporary table, wherein the specified generating uses data values of the first predicate and the second predicate and (b) specifying an antijoin operation to provide the first transformed query statement that uses the first temporary table and a table referenced in the query statement; (c) specifying generation of a second temporary table, wherein the generation uses data values of the first predicate and the third predicate and (b) specifying an antijoin operation to provide the second transformed query statement that uses the second temporary table and a referenced table referenced in the query statement; evaluating for execution a first candidate access path associated to the first transformed query statement; evaluating for execution a second candidate access path associated to the second transformed query statement; selecting the first candidate access path as an access path for execution.

17. The computer implemented method of claim 1, wherein the parsing includes parsing the query statement and determining from the parsing that the query statement is a compound predicate query statement that includes the first predicate, the second predicate and a third predicate; responsively to the parsing, rewriting the obtained query statement to provide a transformed query statement, wherein the rewriting includes (a) specifying generating of a temporary table, wherein the specified generating includes performing a cross join that uses data values of the first predicate, the second predicate and the third predicate.

18. The computer implemented method of claim 1, wherein the first predicate is a first non-existential IN LIST predicate, and wherein the second predicate is a second non-existential IN LIST predicate, wherein the specifying generating of the temporary table includes specifying performing a cross join using data values of the first non-existential IN LIST predicate and data values of the second non-existential IN LIST predicate to define a Cartesian product, wherein the first predicate and the second predicate reference a common table, and wherein the specifying an antijoin operation that uses the temporary table and a table referenced in the query statement includes specifying an antijoin that uses the temporary table and the common table, wherein the evaluating includes examining logging data of a data repository to determine an amount of storage space available in a cache memory for storage of the temporary table, determining a size of the temporary table, comparing the determined amount of storage space available in a cache memory for storage of the temporary table to the determined size of the temporary table, ascertaining based on the comparing that there is sufficient storage space in the cache memory for storage of the temporary table, and qualifying the transformed query statement for further evaluation processing by the evaluating responsively to the ascertaining based on the comparing that there is sufficient storage space in the cache memory for storage of the temporary table, wherein the method includes obtaining a subsequent query statement, performing transformation processing for transforming the subsequent query statement into a transformed subsequent query statement, wherein the performing transformation processing includes specifying providing of a generated temporary table by cross joining data values of first and second predicates of the subsequent query statement, examining logging data of a data repository to determine an amount of storage space available in a cache memory for storage of the generated temporary table, determining a size of the generated temporary table, comparing the determined amount of storage space available in a cache memory for storage of the generated temporary table to the determined size of the generated temporary table, ascertaining based on the comparing that there is insufficient storage space in the cache memory for storage of the generated temporary table, and disqualifying the transformed subsequent query statement for further evaluation processing to determine whether to execute the transformed subsequent query statement responsively to the ascertaining based on the comparing that there is insufficient storage space in the cache memory for storage of the generated temporary table.

19. A computer program product comprising:
a computer readable storage medium readable by one or more processing circuit and storing instructions for execution by one or more processor for performing a method comprising:
obtaining a query statement;
parsing the query statement and determining from the parsing that the query statement is a compound predicate query statement that includes a first predicate and a second predicate;
responsively to the parsing, rewriting the obtained query statement to provide a transformed query statement, wherein the rewriting includes (a) specifying generating of a temporary table, wherein the specified generating uses data values of the first predicate and (b) specifying a join function that uses the temporary table and a table referenced in the query statement;
evaluating a candidate access path associated to the transformed query statement;
selecting the candidate access path as an access path for execution; and
executing the transformed query statement according to the selected candidate access path for execution.

20. A system comprising:
a memory;
at least one processor in communication with the memory; and
program instructions executable by one or more processor via the memory to perform a method comprising:
obtaining a query statement;
parsing the query statement and determining from the parsing that the query statement is a compound predicate query statement that includes a first predicate and a second predicate;
responsively to the parsing, rewriting the obtained query statement to provide a transformed query statement, wherein the rewriting includes (a) specifying generating of a temporary table, wherein the specified generating uses data values of the first predicate and (b) specifying a join function that uses the temporary table and a table referenced in the query statement;
evaluating a candidate access path associated to the transformed query statement; selecting the candidate access path as an access path for execution; and
executing the transformed query statement according to the selected candidate access path for execution.

* * * * *